A. A. FAIR.
POULTRY FEEDER.
APPLICATION FILED JAN. 6, 1916.
1,203,865.
Patented Nov. 7, 1916.
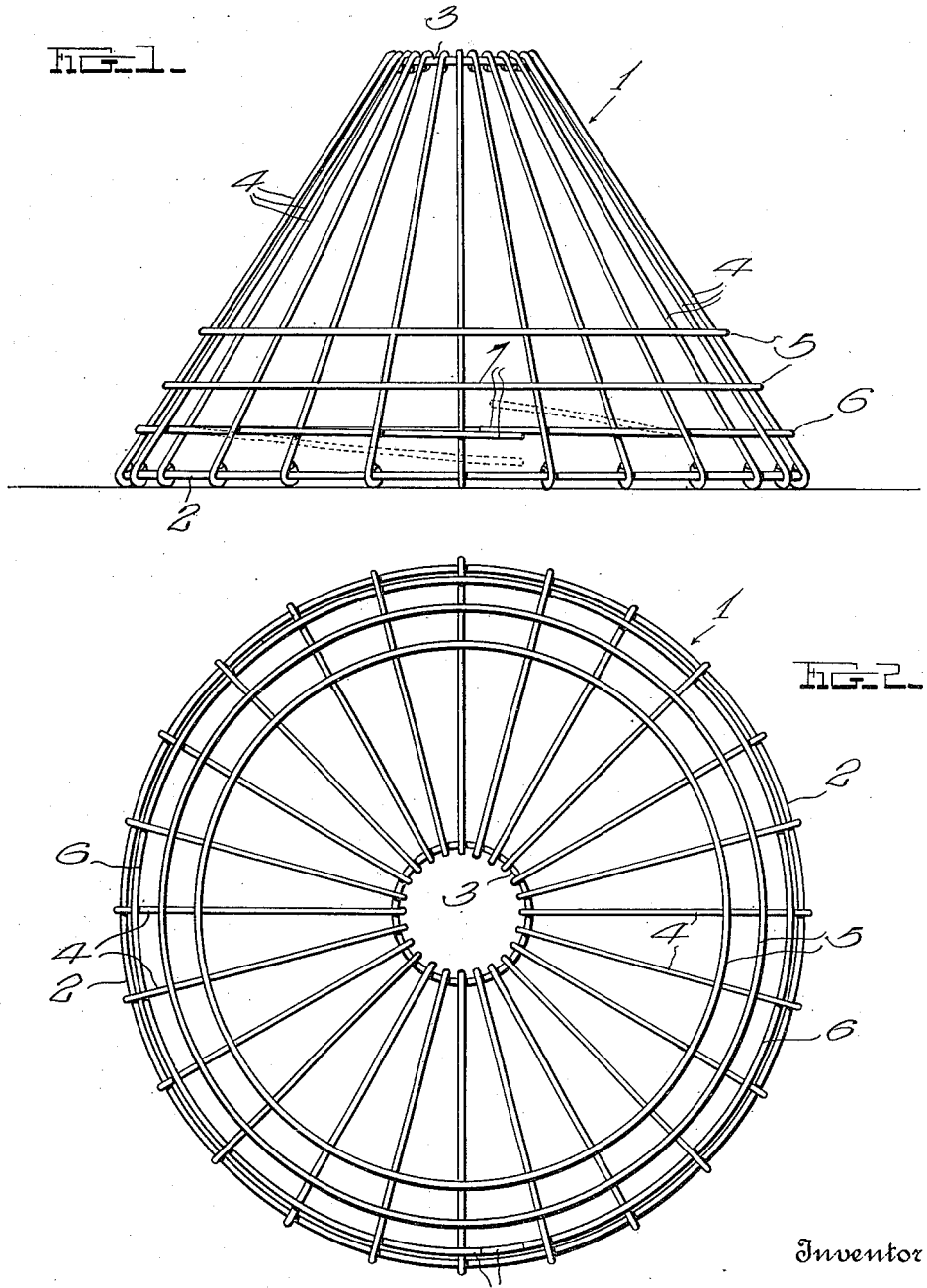
Witness
H. Woodard
Inventor
Andrew A. Fair
By H. R. Willson & Co.
Attorneys

UNITED STATES PATENT OFFICE.

ANDREW A. FAIR, OF SIOUX CITY, IOWA.

POULTRY-FEEDER.

1,203,865.　　　　Specification of Letters Patent.　　Patented Nov. 7, 1916.

Application filed January 6, 1916. Serial No. 70,665.

*To all whom it may concern:*

Be it known that I, ANDREW A. FAIR, a citizen of the United States, residing at Sioux City, in the county of Woodbury and State of Iowa, have invented certain new and useful Improvements in Poultry-Feeders; and I do declare the following to be a full, clear, and exact description of the invention, such as will enable others skilled in the art to which it appertains to make and use the same.

My invention relates to the type of poultry feeders employing a cage in which feed is to be placed, whereby only fowls under a certain size may have access thereto, the object of the invention being to provide an extremely simple and inexpensive article of this class which may be adjusted to allow birds of different size to feed therefrom.

With this general object in view, the invention resides in certain novel features of construction to be hereinafter fully described and claimed, the descriptive matter being supplemented by the accompanying drawing which constitutes a part of this specification and in which:

Figure 1 is a side elevation of the improved feeder; and, Fig. 2 is a top plan view thereof.

In specifically describing the construction shown in the drawing above briefly described, similar characters will be placed on corresponding parts throughout the several views, and reference will be herein made to the numerous elements by their respective indices. To this end, the numeral 1 designates a cage which includes a bottom hoop 2 preferably formed of wire and of considerable diameter, an upper hoop 3 spaced above the lower hoop and of much smaller diameter, and a plurality of approximately upright wire rods 4 having their upper and lower ends bent respectively around the hoops 3 and 2.

The lower ends of the rods 4 are spaced an appropriate distance to allow comparatively large birds to pass therebetween, said rods being held in this relation not only by their connections with the hoop 2, but by one or more additional hoops 5 which surround the aforesaid rods, being spaced vertically thereon and rigidly secured thereto by any preferred means such as solder. The lowermost hoop 5 is spaced from the hoop 2 an appropriate distance for allowing such comparatively large birds to pass thereunder provided a movable hoop 6 between the hoops 2 and 5 is raised or lowered to the necessary extent.

The hoop 6 above mentioned is in the form of a split ring passing under alternate rods 4 and over the intervening rods as shown clearly in the drawing, the ends 7 of said hoop being disconnected whereby they may move independently of each other when said hoop is raised or lowered. Obviously, if the hoop in question be raised its diameter must decrease, this being allowed by the free ends 7 which similarly permit the diameter of such hoop to increase when lowered. The frictional contact existing between the rods 4 and the movable hoop 6 will retain the latter in any desired position without other fastening means. As an example of one of the many positions to which the hoop in question may be moved, see the dotted lines in Fig. 1, which illustrate the ends of said hoops spaced vertically to allow small birds to pass into the cage.

All parts of the improved feeder are preferably formed of heavily galvanized or tinned wire to prevent rusting, but obviously other materials might well be used without departing from or sacrificing any of the advantages of the invention as claimed. If constructed as described or substantially so, the article will be found to possess a number of advantageous characteristics and to fulfil a long felt need in the art to which it relates. Furthermore, its extreme simplicity permits of its being placed on the market at an exceedingly low price and with little difficulty, all of these features being salient in a device of the character described.

I claim as my invention:

1. A poultry feeder comprising a cage in which feed is to be placed, said cage including a plurality of upstanding rods spaced apart distances to allow comparatively large birds to pass therebetween, a horizontally disposed hoop secured to said rods and spaced upwardly from the lower ends thereof a distance to allow such comparatively large birds to pass thereunder, and a movable hoop spaced beneath the other hoop and adapted to be adjusted vertically to only admit birds under a certain size.

2. A poultry feeder comprising a cone-shaped cage including a plurality of upwardly and inwardly inclined rods spaced apart at their lower ends distances to allow comparatively large chicks to pass therebetween, a fixed horizontal hoop secured to said rods and spaced upwardly a sufficient distance to allow said comparatively large chicks to pass thereunder, and a vertically adjustable hoop contacting with the rods and disposed below the aforesaid hoop to permit only fowls under a certain size to enter the cage, said second hoop being split to allow it to contract when adjusted upwardly along the rods and to expand when moved downwardly thereon.

3. A poultry feeder comprising a cone-shaped cage including a plurality of upwardly and inwardly inclined rods forming the wall of said cage, the lower ends of said rods being spaced sufficiently to allow comparatively large chicks to pass therebetween, a fixed horizontal hoop secured to said rods and spaced upwardly a distance to allow said comparatively large chicks to pass thereunder, and a vertically adjustable hoop disposed beneath the other hoop to allow only chicks under a certain size to enter the cage, said vertically adjustable hoop being split to allow it to expand and contract when adjusted vertically, and being passed under certain rods and over others whereby it will be held in vertically adjusted position by frictional contact with said rods.

In testimony whereof I have hereunto set my hand in presence of two subscribing witnesses.

ANDREW A. FAIR.

Witnesses:
W. L. AYERS,
JOHN SCOTT, Jr.

Copies of this patent may be obtained for five cents each, by addressing the "Commissioner of Patents, Washington, D. C."